# UNITED STATES PATENT OFFICE.

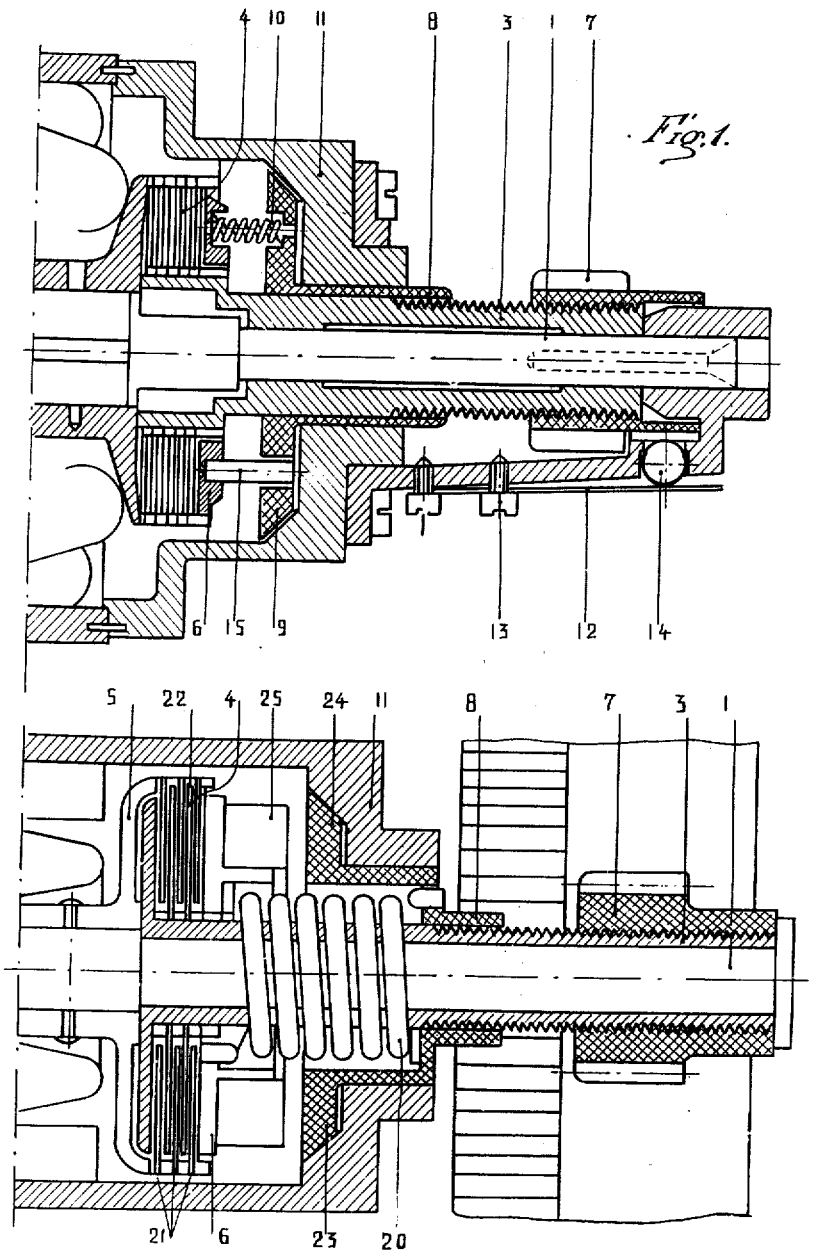

GUIDO FORNACA, OF TURIN, ITALY.

DEVICE FOR AUTOMATICALLY AND GRADUALLY THROWING INTO GEAR TWO TOOTHED GEARINGS.

1,403,022.　　　Specification of Letters Patent.　　Patented Jan. 10, 1922.

Application filed June 11, 1920. Serial No. 388,093.

*To all whom it may concern:*

Be it known that I, GUIDO FORNACA, a subject of the King of Italy, residing at and whose post-office address is 7 Via Giannone, Turin, in the Kingdom of Italy, have invented certain new and useful Improvements in Devices for Automatically and Gradually Throwing Into Gear Two Toothed Gearings; and I do hereby declare the following to be a full, clear, and exact description of the invention, such as will enable others skilled in the art to which it appertains to make and use the same, reference being had to the accompanying drawings, and to letters or figures of reference marked thereon which form a part of this specification.

This invention has for its object some improvements in the device for automatically and gradually throwing into gear two moving gearings described and claimed in my prior U. S. Patent 1,245,452 dated 6th November, 1917.

Experience has taught that the pinion screwed on the sleeve may be caused to turn with this latter without being shifted longitudinally when, owing to dirt, thick or frozen lubricating oil, or any other reason, the friction of the screw acquires a value which is greater than the resistance due to the inertia of the pinion. Moreover, when the driven shaft—turning at a higher speed—is started and the pinion is inoperative, this latter may be thrown again into gear, if the driving shaft is still rotating.

This invention has for its object some improvements which eliminate the above mentioned inconveniences. Said improvements are characterized by the fact that an adjustable pressure is brought upon the pinion by means of a spring, so that the resistance against rotation due to the inertia of the pinion in addition to the resistance due to the pressure of the spring cannot be overcome by the friction of the screw. A control member is conveniently connected to the friction disc and acts on the driving shaft when the driven shaft is started and the pinion has become inoperative. The brush, against which the pinion is thrown in order to press the discs together is not fast to the friction disc, and is provided with a conical flange, this latter, according to the first constructional form, being connected with the friction disc by means of pins provided on its edge and engaging in corresponding holes in the flange and of springs placed alternately between the pins. These latter serve for the transmission of motion, and the springs hold the discs slightly engaged, slightly pressing at the same time the conical bush flange against the motor head or cover.

According to the second constructional form the pins and springs connecting the flange with the friction disc are replaced by a single coaxial helical spring; according to this arrangement the device is simpler, and the pinion teeth are prevented from striking against the rim teeth, when the gears do not mesh properly.

In this case the clutch will slide, being merely acted upon by the initial spring pressure, which is conveniently controlled. One end of the spring is connected with the friction disc while the other end is secured to the bush, to which the spring transmits the rotary motion received by the motor through the friction clutch. The bush being controlled by the conical flange, which is pressed by the spring against the inner wall of the cover plate of the motor, it produces a torsional stress of the spring, which lasts as long as the motor is operative. When the motor is stopped, the spring extends causing the friction disc and the bush to rotate in opposite direction to the motor, thus forcing the pinion outwardly into the proper position for being thrown again into gear as soon as the motor is started.

In the annexed drawing is illustrated by way of example the device forming the object of the present invention in connection with an explosion engine provided with an electric starting motor.

Fig. 1 is a longitudinal section of the first constructional form.

Fig. 2 is a longitudinal section of the second constructional form, the pinion being out of mesh.

Figure 3:
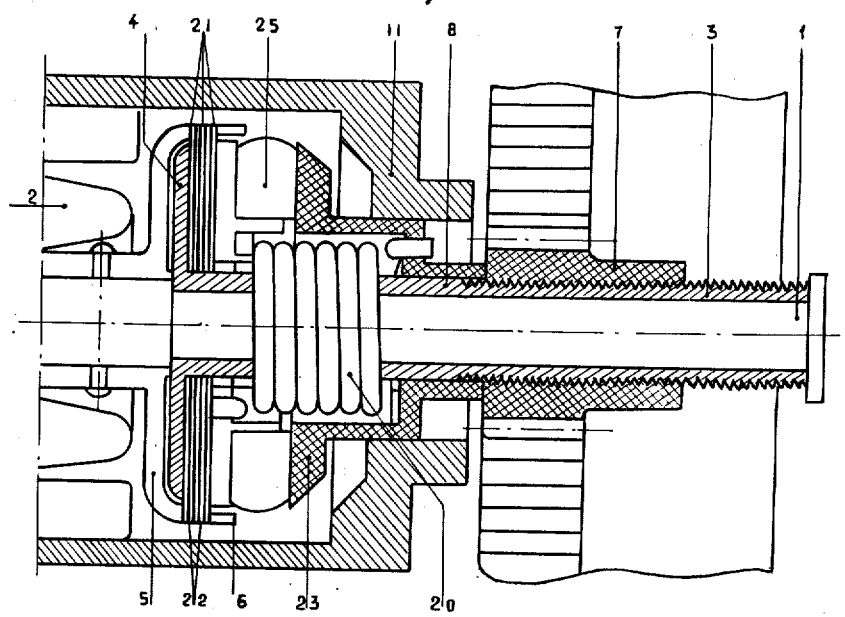
Fig. 3 is a similar view to Fig. 2, the pinion being shown in the starting position.

On the shaft end 1 is secured the armature 2 of the electric motor and is loosely mounted the sleeve 3 which is externally threaded.

Said sleeve receives the rotary motion from the shaft of the electric motor by means of the multiple disc friction clutch 4, the driving discs of which are fast to the hollow sleeve 5 secured to the shaft 1.

The driven and driving clutch discs are pressed together by the friction disc 6 owing to a slight pressure of springs 10. The engagement of the clutch is effected by the friction disc 6, when the pinion 7 screwed on to the sleeve 3 strikes at the end of its path against the bush 8 to which is attached a disc 9 transmitting the translatory motion to the friction disc by means of springs 10 and receiving the rotary motion by means of the pins 15.

Said disc 9, the annular surface of which is in the shape of a truncated cone, adheres, when the device is inoperative, to the inner surface of the shell cover 11 in order to control the motor shaft.

A spring 12 provided with an adjusting screw 13 presses a ball 14 against the pinion hub 7 preventing the same from turning with the sleeve 3.

The device works as follows:

When the current is fed to the electric motor, the sleeve 3 receiving the rotary motion from the shaft by means of the friction coupling 4 is caused to rotate. The pinion 7 loosely screwed on the sleeve 3 owing to the inertia and pressure of the adjustable spring 12 is prevented from turning and is axially shifted and thrown into gear with the toothed rim fast to the flywheel of the motor to be started.

At the end of its path, the pinion owing to the resistance of the motor is pressed against the bush, thus effecting the engagement of the friction clutch.

The pinion transmits thus to the toothed rim all of the energy of the motor.

As soon as the explosion engine is started, the toothed rim turning at a higher speed than the pinion, loosens this latter causing it to resume its inoperative position, where it is maintained by the adjustable spring 12; at the same time the disc 9, forced by the springs 10 against the cover plate of the shell, brakes the shaft of the electric motor.

Figure 4:
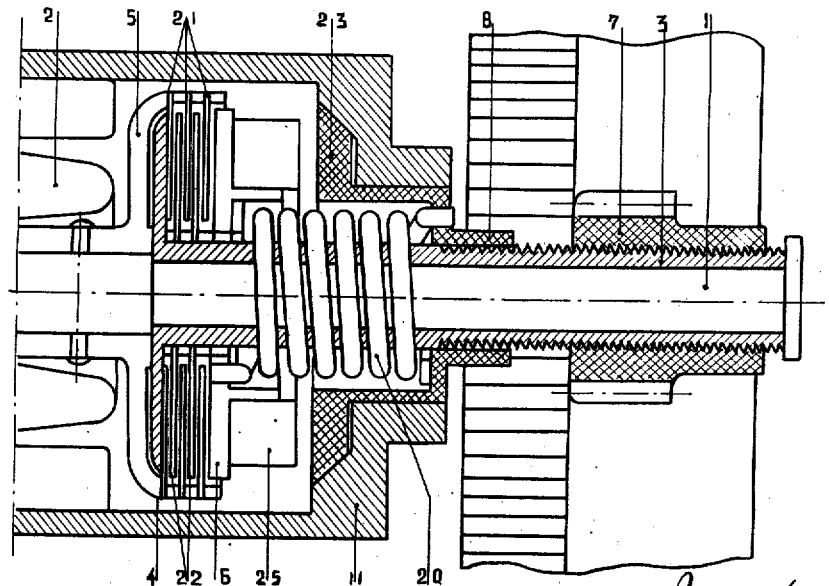
Fig. 4 shows the pinion teeth striking against the rim teeth.

Referring to Figs. 2 to 4, showing another constructional form of this device, the friction disc 6 keeps the driven discs 22 and driving discs 21 of the clutch pressed together, through a slight pressure of the spring 20, one end of which is secured to the friction disc 6 while the other end is attached to the bush 8 provided with a flange 23. Said flange, having its annular surface 24 in the shape of a truncated cone, adheres when the apparatus is out of work, to the inner surface of the shell cover 11, in order to control the shaft of the motor. An elastic ring 25 is supported by the friction disc 6 and it absorbs the shock at the end of the path of the bush 8, when this latter is acted upon by the pinion 7.

The device works as follows:

When inoperative, the pinion 7 is placed at the end of the screwed sleeve 3. When the electric motor is started, it transmits the motion to the sleeve 3 through the friction clutch 4, formed by the discs 21 and 22, that are subjected to an initial pressure by the spring 20. The rotary motion of the sleeve 3 causes the pinion 7 to be screwed on said sleeve and to be shifted towards the toothed rim. If the teeth of the pinion mesh with those of the rim, the pinion will move further on reaching the bush 8 and pressing through this latter the spring to such a degree as to produce a sufficient friction between the discs 21 and 22 of the clutch 4, such as to give the requisite stress for transmitting the motion to the flywheel of the motor.

The elastic ring 25 absorbs the shock between the metal parts.

In case the teeth of the pinion 7 do not correspond with the spaces between the teeth of the toothed rim, the clutch will slide, being merely acted upon by the initial pressure of spring 20, this latter being conveniently adjusted; and (see Fig. 4) the pinion 7 being still far from the bush 8, no pressure is exerted upon this latter. The stress thus transmitted to the pinion cannot break or crush the teeth of the gearings.

The spring 20, one end of which is attached to the friction disc 6 while the other end is connected to the bush 8, transmits to this latter the rotary motion received by the motor through the friction clutch 4. The spring is so disposed that it tends to unwind when it turns in the same direction as the electric motor. This unwinding keeps the friction disc 6 slightly pressed against the discs 21, 22 and the flange 23 against the cover wall 11. It is obvious that when the electric motor turns, the spring, owing to the slight friction between the friction disc 6 and the flange 23, tends to unwind. When the electric motor ceases to rotate the spring winds up (assuming the normal position) and causes the friction disc 6 to rotate in the direction opposite to that imparted by the electric motor when the latter rotates. The friction disc 6 being attached to the sleeve 3, it transmits the rotary motion, caused by the winding up of the spring, to said sleeve 3 which by turning in a direction opposite to electric motor, drives the pinion 7 off from the toothed rim.

What I claim is:

1. The combination with a driving and a driven member, and means for effecting the engagement of said members comprising a clutch, of a control member connected with the latter adapted to automatically position the driving member for engagement with the driven member.

2. The combination with a driving and a driven gear, and means for effecting the engagement of said gears comprising a clutch, of a control member, yielding means connecting the latter with the clutch adapted to move the driving gear into meshing position with the driven gear.

3. The combination with a driving and a driven gear, means for effecting the engagement of said gears comprising a clutch, of a control member and a spring interposed between the control member and clutch adapted to operate the latter and the control member whereby the driving gear is brought into meshing position with the driven gear.

4. The combination with a driven gear, a driving shaft having a gear, a sleeve on the shaft for shifting the driving gear, and a clutch for operating the sleeve, of a control member, and means connecting the latter with the clutch whereby the driving gear is moved automatically into meshing position with the driven gear.

5. The combination with a driven gear, a driving shaft having a gear, a sleeve on the shaft for shifting the driving gear, and a friction clutch for operating the sleeve, of a control member, and a spring connecting the clutch and control member arranged to be distorted by the operation of the clutch and control member, said spring operating to actuate the clutch to move the driving gear into meshing position with the driven gear.

6. The combination with a driven gear, a driving gear, an electric motor, a friction clutch for connecting the motor with the driving gear, and means including the clutch operable by the movement of the motor for effecting the engagement of the gears, of a control member, and means connecting the latter with the clutch operable upon the starting of the motor for moving the driving gear into meshing position with the driven gear.

7. The combination with a driven gear, a driving gear, an electric motor, a friction clutch for connecting the motor with the driving gear, and means including the clutch for effecting the engagement of the gears, of a control member and a spring connecting the latter with the clutch operable upon the stopping of the motor to move the driving gear in the direction opposite to the direction imparted by the motor.

In testimony that I claim the foregoing as my invention, I have signed my name.

GUIDO FORNACA.